April 24, 1962   L. A. BRYAN ET AL   3,031,497
PREPARATION OF BARIUM SULFONATES
Filed April 23, 1959
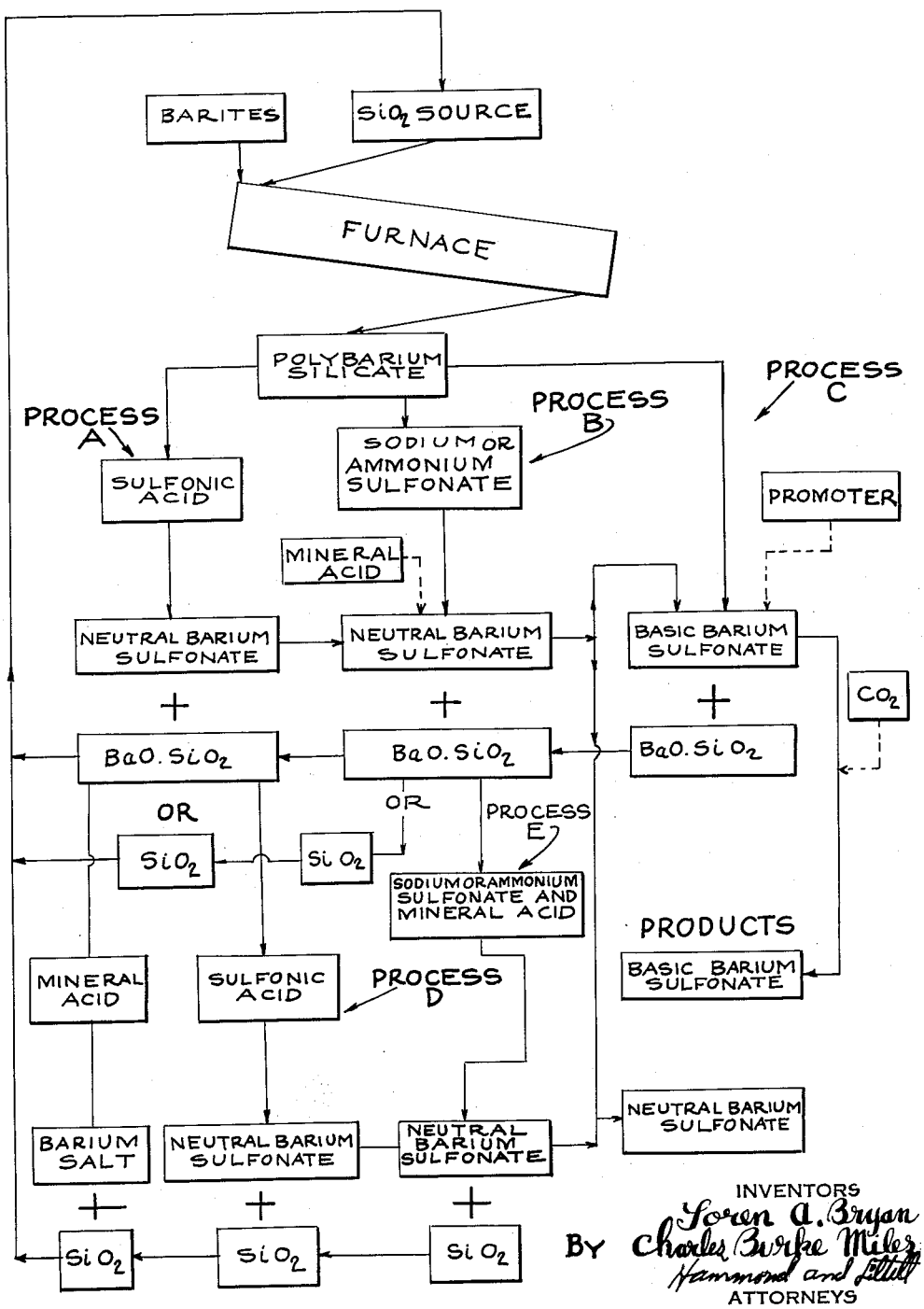

United States Patent Office 3,031,497
Patented Apr. 24, 1962

3,031,497
PREPARATION OF BARIUM SULFONATES
Loren A. Bryan, Rahway, and Charles Burke Miles, Westfield, N.J., assignors to FMC Corporation, a corporation of Delaware
Filed Apr. 23, 1959, Ser. No. 808,368
10 Claims. (Cl. 260—504)

This invention relates to an improved process for the preparation of barium sulfonates by a reaction of organic sulfonic acids or sulfonates with barium silicates. The barium silicates are prepared by the decomposition of insoluble barium compounds with a source of silicon dioxide, and the residual silicon dioxide containing materials from the reaction of organic sulfonic acids and sulfonates with barium silicates is recycled as this source of silicon dioxide.

Barium salts of organic sulfonic acids have found wide application as articles of commerce in substantial tonnages. The barium salts of organic sulfonic acids are useful as paint additives, insecticides, rust preventatives and detergents in motor oils. The oil-soluble barium salts of organic sulfonic acids have been found to be especially useful as additives for the improvement of lubricating oils. These oil-soluble barium salts of organic sulfonic acids have dispersant properties and prevent ring sticking and deposition of lacquer on pistons and other functional parts in gasoline and diesel engines.

The preparation of sulfonic acids in the up-grading of petroleum oils by treatment of the oil with strong sulfuric acid or oleum has been common practice in the oil refining industry for several years. The resulting petroleum sulfonic acids of molecular weight lower than about 350 are water-soluble and are called "green acids." The sulfonic acids of higher molecular weight are called "mahogany acids," and upon neutralization form oil-soluble salts.

The barium petroleum sulfonates may be classified as "neutral salts" or "basic salts." The latter class contains an excess of barium over that required for the neutral salt and has some titratable alkalinity.

The "neutral" salts have heretofore been produced by neutralization of sulfonic acids or by a metathesis reaction with a sodium sulfonate. In general, the barium compounds used for neutralization of the sulfonic acids are barium oxide or barium hydroxide. For the preparation of a barium sulfonate from a salt of an organic sulfonic acid two methods are known. A barium halide such as $BaCl_2$ is reacted with sodium sulfonate in the presence of water in a metathesis that yields barium sulfonate and sodium halide. Another reaction involves the displacement of ammonia from an ammonium sulfonate by a basic barium compound. In general, the barium compounds used in any of these reactions are barium oxide or barium hydroxide. Barium oxide hydrates readily and is lower in unit cost than the hydroxide. This is one reason why it is used. Barium oxide can be slurried in oil and then reacted with sulfonic acid in the presence of water. Barium oxide can also be dissolved in methanol and reacted with sulfonic acid to produce barium sulfonates. Water or alcohol is necessary for practically all of these reactions. Water may be added as water or as water of crystallization in barium hydroxide.

The "basic" salts are salts of barium and an organic acid in which the amount of barium combined is substantially in excess of the stoichiometric amount required to prepare the neutral salt of the acid. While there are several possible explanations of this phenomenon the following is one of the simplest ways of representing it.

(1) 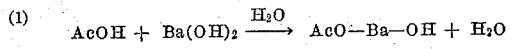

(2) 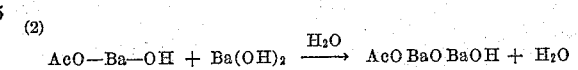

Basic salts may be prepared in a number of ways. One well known method is to use a weakly acid promoter such as a phenol. In this case the Reaction 2 would be represented as follows:

(2a) 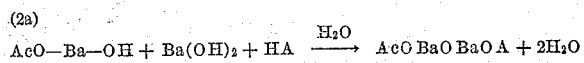

In the above formulas AcOH is an oil-soluble organic acid and HA is a weakly acidic material such as a phenol. The above products can be treated with an acid gas, such as $CO_2$. This is a stronger acid than HA in the presence of water and causes the release of HA or neutralization of the free hydroxyl group:

(3) 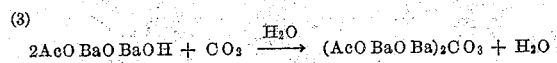

or (4a) 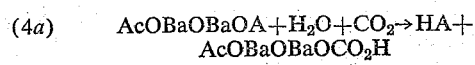

or (4b) 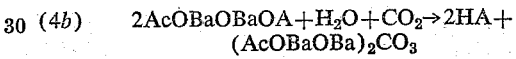

The final neutral product as shown in Equations 3, 4a and 4b would contain four equivalents of metal for an equivalent of the organic acid radical, AcO. The performance of these salts when added to lubricating oils as dispersants (detergents) improves as their metal content increases, and the chemical combination of several equivalents of metal for each equivalent of organic acid to give an oil-soluble product makes it possible to obtain a concentrate which can be added in much smaller proportions to a lubricant and still obtain the same metal content and performance as would be present if larger amounts of a normal or neutral salt of the acid were added.

All of these processes require the use of barium hydroxide or barium oxide as a source of barium and, by present commercial methods, these compounds are fairly expensive. Barium occurs naturally in such insoluble ores as barite ($BaSO_4$) and witherite ($BaCO_3$). Barite ore is commercially available in large amounts. The present commercial process for producing barium hydroxide or barium oxide from barite involves many operations and results in substantial production costs. It involves decomposing the barium sulfate by heating with coke in a rotary kiln furnace to produce barium sulfide according to the following reaction:

(5) 

The barium sulfide is leached from the kiln product and converted to $BaCO_3$ by reaction with soda ash or carbon dioxide. The barium carbonate is decomposed with carbon to give barium oxide in an electric-arc or fuel-fired furnace as follows:

(6) 

The barium oxide is hydrated to obtain barium hydroxide.

An object of our invention is the production of barium salts of sulfonic acids by reaction with barium silicates.

A further object of our invention is a new and improved process for the production of neutral barium sulfonates from the neutralization of sulfonic acids with water-insoluble barium silicates or barium silicates containing water-soluble barium values.

Another object of our invention is a new and improved process for the production of neutral barium sulfonates by a metathesis reaction of sodium sulfonates with barium silicates containing water-soluble barium values.

Another object of our invention is a new and improved process for the production of basic barium sulfonates by the reaction of neutral barium sulfonates with barium silicates containing water-soluble barium values.

A still further object of our invention is a new and economical process for the continuous production of barium salts of sulfonic acids by the decomposition of an insoluble barium-containing mineral with a source of silicon dioxide to give a barium silicate, reacting the barium silicate with a sulfonic acid or a sulfonate to give a barium salt of a sulfonic acid and a silicon dioxide-containing residue and recycling this residue as a source of silicon dioxide.

Various other objects and advantages of our invention will appear as this description proceeds.

We have discovered that in a simple two-step reaction, in step one an insoluble barium-containing mineral such as barite can be decomposed by heating with a source of silicon dioxide to give a barium silicate containing water-soluble barium values. This barium silicate containing water-soluble barium values is for convenience hereinafter sometimes called polybarium silicate. This polybarium silicate in step two can be reacted with an organic sulfonic acid directly to give a neutral barium sulfonate and either a silicon dioxide residue or a barium silicate residue. The barium silicate residues differ from polybarium silicate in that a portion of the available barium has been removed by a prior reaction. The barium silicate residue can be likewise reacted with an organic sulfonic acid to give a neutral barium sulfonate and a silicon dioxide residue. The polybarium silicate can also be reacted with a salt of a sulfonic acid by a metathesis reaction to give a neutral barium sulfonate and a barium silicate residue. Also, neutral barium sulfonate prepared in any manner can be reacted with polybarium silicate, in the presence of a promoter, if desired, to give basic barium sulfonates and barium silicate residues. The barium silicate residues can be further reacted with organic sulfonic acids as noted above or with other strong acids or they can be recycled along with the silicon dioxide residues as the source of silicon dioxide in the original decomposition reaction.

FIGURE 1 is a diagrammatic flow sheet of the cyclic process for preparing barium salts of organic sulfonic acids according to our invention.

As therein illustrated, polybarium silicate containing soluble barium values is prepared by heating a barium-containing mineral with a source of silicon dioxide at a temperature between 1300 and 1500° C. This polybarium silicate is reacted with various sulfonic acids or sulfonates according to processes A, B, C, D or E to produce neutral or basic barium sulfonates and the unreacted barium values and silicon dioxide are recycled and reused in the process.

The polybarium silicate containing water-soluble barium values is prepared by decomposing insoluble barium-containing compounds such as barium sulfate, barium carbonate, barium sulfite, etc., with a source of silicon dioxide by heating at temperatures of between 1300 and 1500° C. for the required period of time. If an excess of barium over a barium to silicon ratio of 1 to 1 is utilized in the feed material, a barium silicate will result which contains most of the excess reacted barium in a form that is water-soluble. The theoretical equation for this reaction with $BaSO_4$ as a starting material is as follows:

(7) $\quad 2BaSO_4 + SiO_2 \rightarrow 2BaO.SiO_2 + 2SO_2 + O_2$

This polybarium silicate so produced reacts with an organic sulfonic acid as follows:

(8)

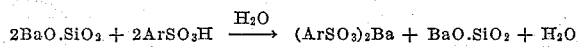

The $BaO.SiO_2$ residue is water-insoluble, but it likewise reacts with an organic sulfonic acid as follows:

(9)

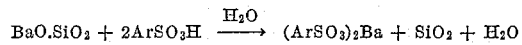

The polybarium silicate also undergoes metathesis with organic sulfonates as follows:

(10a)

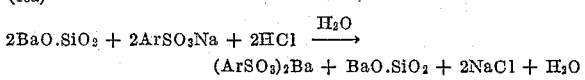

or (10b)

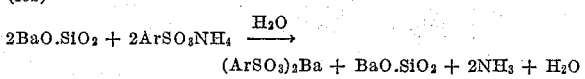

The organic sulfonates will react further with the barium silicate residue in the presence of mineral acid to form neutral barium sulfonates as follows:

(11)

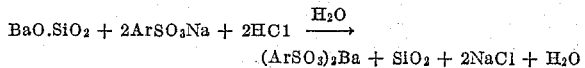

The polybarium silicate also reacts with neutral barium sulfonates in the presence of phenolic promoters as follows:

(12)

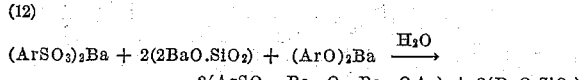

Upon treatment of the above product with an acid gas such as $CO_2$ the promoter is released similar to Equations 4a and 4b according to the following:

(13) $2(ArSO_3-Ba-O-Ba-OAr) + H_2O + CO_2 \rightarrow$
$\quad (ArSO_3-Ba-O-Ba)_2CO_3 + 2ArOH$ The promoter may be recovered and reused.

The $BaO.SiO_2$ and the $SiO_2$ residues may be recycled as a source of silicon dioxide as follows:

(14) $\quad BaSO_4 + BaO.SiO_2 \rightarrow 2BaO.SiO_2 + SO_2 + \frac{1}{2}O_2$ or

(15) $\quad 2BaSO_4 + SiO_2 \rightarrow 2BaO.SiO_2 + 2SO_2 + O_2$

Varying amounts of $BaSO_4$ may be used in excess of the 2 to 1 ratio of barium to silicon shown, with increasing yields of water-soluble barium values. However, if amounts in excess of a 2.7 to 1 ratio are used difficulties are encountered in that the barium silicate produced undergoes sintering or fusion which results in a product which is difficult to react. Inasmuch as the insoluble barium silicate can be recycled, high yields of water-soluble barium values can be obtained without the use of a high barium to silicon ratio.

The reaction to produce barium silicate containing water-soluble barium values from other barium compounds is similar as shown in the following equations utilizing barium carbonate and barium sulfite as starting materials:

(16) 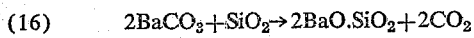
$$2BaCO_3 + SiO_2 \rightarrow 2BaO.SiO_2 + 2CO_2$$

(17) 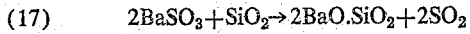
$$2BaSO_3 + SiO_2 \rightarrow 2BaO.SiO_2 + 2SO_2$$

In the flow sheet, Reaction 7 or 14 and/or 15 takes place in the kiln. Process A is that of Reaction 8 or 8 and 9, Process B is that of Reactions 10a and 10b, Process C is that of Reactions 12 and 13, Process D is that of Reaction 9, and Process E is that of Reaction 11. Optionally Processes A and C can be combined in one operation. The recycling steps are those of Reactions 14 and 15.

As organic sulfonic acids, we may use any sulfonic acid having an organic radical attached thereto. This radical can be either aliphatic or cyclic. We prefer to use oil-soluble sulfonic acids derived from hydrocarbons having at least 18 carbon atoms.

The following are specific examples of oil-soluble sulfonic acids which may be used. For every sulfonic acid enumerated it is intended that the barium salt thereof is also illustrated. Such sulfonic acids are mahogany sulfonic acids; petrolatum sulfonic acids; mono- and poly-wax-substituted sulfonic and polysulfonic acids; sulfonic and polysulfonic acids of aromatic compounds, for example, naphthalene, benzene, diphenyl ether, naphthalene disulfide, diphenyl amine, thiophene, alpha-chloronaphthalene, etc.; substituted sulfonic acids such as cetylchlorobenzene sulfonic acids, cetylphenyl monosulfide sulfonic acids, cetoxycaprylbenzene sulfonic acids, dicethylthianthrene disulfonic acid, dilauryl beta-naphthol sulfonic acids, dicapryl nitronaphthalene sulfonic acids, aliphatic sulfonic acids such as paraffin wax sulfonic acids, unsaturated paraffin wax sulfonic acids, hydroxy-substituted paraffin wax sulfonic acids, tetraisobutylene sulfonic acids, tetra-amylene sulfonic acids, chloro-substituted paraffin wax sulfonic acids, nitroso paraffin wax sulfonic acids, etc.; cycloaliphatic sulfonic acids such as petroleum naphthene sulfonic acids, cetyl-cyclopentyl sulfonic acids, lauryl cyclohexyl sulfonic acids, bis-(diisobutyl) cyclohexyl sulfonic acids, mono- or poly-wax substituted cyclohexyl sulfonic acids, etc.

From the above oil-soluble sulfonic acids, the so-called petroleum sulfonic acids are both readily available and admirably adapted to our process. A variety of sulfonic acids are produced in the up-grading of lubricating oil and their specific chemical structures will vary according to the type of oil being treated and the extent of treatment with the sulfonating agent. In this process, we are dealing with sulfonic acids having sufficiently high molecular weight to be classified as mahogany acids. These acids range in molecular weight from about 350 upwards. While it is not possible to define rigidly these water-insoluble acids on the basis of ionization constants, their effective acidity is at least greater than that of oil-soluble monoalkyl phenols, such as octylphenol. While we have limited our examples to the higher molecular weight "mahogany acids," described as "oil-soluble" and as having "oil-soluble salts," there is no intent to exclude the so-called "green acids" of molecular weight below 350 which are water-soluble. If it is desired to produce a barium sulfonate of one of these "green acids," this is within the scope of our invention. In addition, any of the other enumerated sulfonic acids are likewise operable in our process.

In the metathesis reaction, the various alkali metal or ammonium salts of the above acids can be used as starting materials.

The phenolic compounds or their barium salts serving as promoters in the production of "basic" barium sulfonates are illustrated by the following specific examples: phenol, alkylated phenols such as, for example, cresol, xylenol, p-ethyl phenol, diethylphenols, n-propylphenols, di-isopropylphenols, p-t-butylphenol, p-t-amylphenol, p-cyclopentylphenol, sec-hexylphenols, n-heptylphenols, di-isobutylphenols, 3,5,5-trimethyl-n-hexylphenols, octylphenols, n-decylphenols, cetylphenols, etc.; aryl-substituted phenols, e.g. phenylphenol, diphenylphenol, etc.; polyhydroxy aromatic compounds such as alizarin, quinizarin, or polyhydroxybenzenes, e.g., hydroquinone, catechol, pyrogallol, etc.; monohydroxynaphthalenes, e.g. alpha-naphthol, beta-naphthol; polyhydroxynaphthalenes, e.g. naphthohydroquinone, naphthoresorcinol, etc.; the alkylated polyhydroxy aromatic compounds such as octyl catechols, mono-(tri-isobutyl)-pyrogallols, etc.; substituted phenols such as p-nitrophenol, picric acid, o-chlorophenol, t-butylchlorophenols, p-nitro-o-chlorophenol, p-aminophenol, etc.; lower molecular weight hydroxy aromatic carboxylic acids such as salicylic acid, chlorosalicylic acids, di-isopropyl salicylic acids, gallic acid, 4-hydroxy-1-naphthoic acid, etc.; lower molecular weight aromatic sulfonic acids such as p-cresol sulfonic acid, p-t-butylphenol sulfonic acid, beta-naphthol alpha-sulfonic acid, etc.; and lower molecular weight aromatic acids. We prefer octyl phenol and barium octylphenoxide as promoters.

The acidic material used for treating the organic barium complex to liberate part or all of the promoter and reduce the alkalinity of the complex may be a liquid or a gas. The liquids can include hydrochloric, sulfuric, nitric, carbonic, etc., acids; the gases, hydrogen chloride, sulfur dioxide, carbon dioxide, air (because of its carbon dioxide content), nitrogen dioxide, hydrogen sulfide, nitrogen trioxide, sulfonyl chloride, chlorine dioxide, hydrogen selenide, boron trifluoride, carbon disulfide, and carbon oxysulfide. We prefer gaseous carbon dioxide as a readily available acidic blowing agent.

Barite can be decomposed with silicon dioxide-containing materials without fusion and in high yields in batch or continuous furnaces, such as rotary kilns, by the use of a critically controlled slightly reducing atmosphere in the kiln, so that only small amounts, up to 2% of BaS, are formed in the kiln reaction product and by the use of a barium to silicon ratio of the kiln feed material of from 2.2 to 1 to 2.7 to 1. Conversions can be increased further, with a decrease in occurrence of fusion by pelletizing the kiln charge and by recycling barium silicate or silicon dioxide produced by the sulfonating steps, with provisions for a bleed to avoid build-up of contaminants.

The barium silicate process can utilize barite feeds of various qualities, but best barium efficiency is obtained when a relatively high-grade barite is used. The desirable kiln feed composition is a Ba/Si molar ratio of 2.5, or about 10% $SiO_2$ by weight. A high-grade barite (93% or more $BaSO_4$) requires addition of a substantial amount of $SiO_2$, which can be obtained by recycling monobarium silicate or $SiO_2$ residue, thus permitting also recovery of most of the barium values in the residue.

Theoretically the reactions for the barium silicate process, utilizing recycled monobarium silicate, can be written as follows:

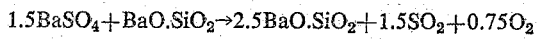
$$1.5BaSO_4 + BaO.SiO_2 \rightarrow 2.5BaO.SiO_2 + 1.5SO_2 + 0.75O_2$$

In practice, however, complete decomposition of barite is not obtained, so that the polybarium silicate contains some $BaSO_4$ which remains unreacted and is recycled with the residue.

The reaction conditions for the production of the various barium salts of sulfonic acids vary somewhat and will be discussed individually as Processes A and D (Equations 8 and 9), Processes B and E (Equations 10a, 10b and 11) and Process C (Equations 12 and 13) are described.

REACTION CONDITIONS FOR PROCESSES A AND D

In general, the reaction medium will consist of a non-aqueous phase comprising a hydrocarbon mixture boiling from about 70° C. upwards to hydrocarbon oils exemplified by SAE 30 motor oil or mixtures thereof containing the dissolved sulfonic acid, and an aqueous phase in intimate contact with the polybarium silicate and the oil phase. Other polar solvents capable of dissolving barium values may be used to replace all or part of the water.

The quantity of barium used is based on the available barium in the polybarium silicate or barium silicate residue that is leachable from the barium silicate with hydrochloric acid. About one equivalent of available barium is used for each equivalent of sulfonic acid to form the neutral salt. When more than one equivalent of available barium is used, the product may be basic unless the reaction time is suitably controlled. If less than one equivalent of available barium per equivalent of sulfonic acid is used, the product will be more acidic than the neutral salt because of the barium deficiency. It is preferable to use a slight excess of available barium, perhaps 5 to 10% so that the total charge corresponds to 105 to 110% of the theoretical amount required to produce the neutral salt.

Reaction periods ranging from 1.25 to 4.5 hours for neutralization and removal of the water represent the range used. The preferred time is not over two hours with up to about one hour for neutralization and the remainder for dehydration of the reaction mixture.

It is convenient to work at the reflux temperature of the reaction mixture. Lower temperatures could be used with additional time expenditures. Dehydration temperatures range from about 100° C. to about 165° C., the higher temperature being sufficient to remove substantially all of the water, although temperatures of up to 180° C. are permissible, provided the hydrocarbon solvent is sufficiently high boiling to remain within the reaction vessel.

A solution of the organic sulfonic acid in a hydrocarbon solvent is placed in a reaction vessel fitted with heating means, stirrer, thermometer and reflux condenser. Water and polybarium silicate (or barium silicate residue) containing sufficient available barium to neutralize the sulfonic acid are added. The stirred mixture is heated under reflux for 0.5 to 3.0 hours. A water trap is then inserted between the reaction vessel and the reflux condenser and the temperature gradually increased to effect removal of the water. When the dehydration is completed, the hot mixture is filtered to remove residual inert material.

REACTION CONDITIONS FOR PROCESSES B AND E

Polybarium silicate is reacted with an alkali metal salt of an organic sulfonic acid in the presence of water and one equivalent of a mineral acid, such as hydrochloric acid or nitric acid, under the same conditions of solvents and temperatures as outlined above. When a sodium sulfonate is utilized as the alkali metal sulfonate, the sodium sulfonate in a hydrocarbon or other solvent is reacted with the barium silicate in the presence of a mineral acid and water at elevated temperatures until substantially all of the sodium in the sulfonate molecule has been displaced by the barium from the barium silicate. The barium silicate should contain a $BaO:SiO_2$ ratio ranging from 0.1:1.0 to about 3.0:1.0 or greater and preferably from about 1.0:1.0 to 3.0:1.0. When an ammonium sulfonate is substituted for the alkali metal sulfonate, the mineral acid can be omitted if the $BaO:SiO_2$ ratio is above 1.0:1.0, and the reaction proceeds with simultaneous dehydration and evolution of ammonia, and the formation of a barium silicate residue.

Alkali metal sulfonates also react with barium silicate residues and mineral acid under the same conditions to form neutral barium sulfonates and a residue of silica.

REACTION CONDITIONS FOR PROCESS C

The reaction can be carried out in mineral spirits or other solvents such as petroleum naphtha, xylene, toluene, ethylbenzene, propylbenzene, butylbenzene, etc.

The time required for the preparation of the metal complex will range from about 2 to 5 hr. or more depending upon the batch size and dehydration time. In addition the product may be blown for 1–5 hr. with an acid gas to neutralize the excess alkalinity of the complex and liberate all or at least most of the promoter, if such is desired. The time required is dependent upon batch size, rate of input of the gas and temperature. It has been found that 3 hr. are generally sufficient to complete the reaction and dehydration, with an additional 3 hr. of mild blowing at elevated temperature with moist carbon dioxide sufficient to neutralize the product.

The temperature for cooking of the ingredients is approximately 100° C. and is controlled by the reflux of the water. During the dehydration step the temperature ranges from about 100° C. to about 165° C. or higher, depending upon the boiling range of the solvent.

Three basic procedures have been used for the preparation of basic salts and will be listed as Methods 1, 2 and 3, respectively.

*Method 1.*—The organic sulfonic acid (50% in oil) or its barium salt, the promoter, and solvent, i.e. mineral spirits, are placed in a reaction vessel equipped with stirrer, thermometer, reflux condenser and heating means and warmed where necessary to provide a homogeneous solution. The polybarium silicate and water are added and the mixture is refluxed for about 2 hours at about 100° C. A water trap is inserted between the reaction vessel and condenser and the mixture dehydrated by increasing the heat gradually to about 160° C. When the dehydration is complete the material is removed and filtered or optionally blown with carbon dioxide for about three hours with the temperature maintained in the range of 135–150° C. and then filtered. The promoter liberated when the blowing with carbon dioxide step is used, may be recovered.

*Method 2.*—The organic sulfonic acid, promoter and solvent such as mineral spirits are placed in the reactor and warmed to provide a homogeneous solution. Then water and enough polybarium silicate are added to neutralize the sulfonic acid, assuming that the total available barium (water-soluble plus acid-soluble) will react with the sulfonic acid. The mixture is refluxed for 1 hr., cooled to about 80° C., the remainder of the polybarium silicate added, and heating continued at the reflux temperature for 1 hr. The temperature is then increased to effect dehydration. After dehydration heating is continued for 1 hr. at 150–160° C., and the processing completed as described under Method 1.

*Method 3.*—This operation involves the use of barium silicate residues left over from a previous preparation of a basic or neutral salt to prepare neutral barium sulfonate by Process D which is then processed according to Method 1.

The following examples illustrate our invention. It is understood, however, that these examples are illustrative only and to enable one skilled in the art to practice our invention. They are not to be considered as limiting in any fashion the scope of our invention.

The specific organic sulfonic acid used in our examples is "Petronic Acid" produced by L. Sonneborn Sons, Inc. This acid consists of 50% of a mahogany petroleum sulfonic acid (a primarily-aliphatic, saturated-hydrocarbon sulfonic acid mix with an average of approximately 25 carbon atoms), 48.5% mineral oil, 1% water and up to 0.5% sulfuric acid. This acid has an acid number of 79 mg. KOH/gram and a molecular weight of 440 to 460. All weights are calculated on the active acid content.

*Examples According to Processes A and D*

In the following tables the results of examples of the process conducted according to the methods outlined above under the teaching "Reaction Conditions for Processes A and D" are tabulated.

Table I gives the reactant variations for Examples 1–5; Table II gives the results.

general conditions as outlined above under the heading "Reaction Conditions for Process C."

Examples of processing according to Method 1 are given in Tables III and IV. In this series various combinations of starting ingredients are shown together with the best combinations of materials to get efficient utilization of the barium. On the basis of the results, Examples 12 and 13, in which barium "Petronate" with octylphenol as promoter reacted with polybarium silicate, gave the highest metal ratio and ranked second in barium effi-

TABLE I

*Quantities of Reactants Used in the Preparation of Barium Sulfonates*

Polybarium Silicate (Process A)

| Example No. | Available Ba | | "Petronic Acid" | | Barium silicate | | Added solvents in gms. | | |
|---|---|---|---|---|---|---|---|---|---|
| | Percent of BaO | Equiv./gm. | Weight in [2] gms. | Equiv. weight | Weight in gms. | Equiv. weight | Mineral spirits | Mineral oil | Water |
| 1 | 79.4 | .0103 | 19.9 | 0.030 | 15.4 | 0.159 | 20 | | 39 |
| 2 | 79.4 | .0103 | 65.8 | 0.100 | 8.76 | 0.091 | 50 | | 20 |

Barium Silicate Residues (Process D) [1]

| 3 | 76.3 | .0100 | 36.3 | 0.055 | 5.42 | 0.054 | 40 | | 20 |
|---|---|---|---|---|---|---|---|---|---|
| 4 | 69.1 | .0090 | 202.0 | 0.300 | 33.6 | 0.303 | 175 | | 60 |
| 5 | 73.1 | .0096 | 134.4 | 0.200 | 20.2 | 0.194 | | 121 | 40 |

[1] Residues from the preparation of basic salts.
[2] Product as received, 50% active in mineral oil.

TABLE II

*Barium "Petronates"*

REACTION CONDITIONS AND RESULTS

Fresh Polybarium Silicate

| Example No. | Time in hrs. | Product | | Barium usage | | | "Petronic Acid" | |
|---|---|---|---|---|---|---|---|---|
| | | Weight in gms. | Percent Ba | Available, equiv. | Reacted, equiv. | Ba efficiency | Added equiv. | Percent neutralized |
| 1 | 1.75 | 53 | | 0.159 | 0.039 | 25 | 0.030 | 130 |
| 2 | 4.50 | 202 | | 0.091 | 0.093 | 102 | 0.100 | 93 |

Barium Silicate Residues

| 3 | 3.75 | 124 | | 0.054 | 0.054 | 100 | 0.055 | 98 |
|---|---|---|---|---|---|---|---|---|
| 4 | 1.40 | 795 | 2.24 | 0.303 | 0.259 | 86 | 0.300 | 86 |
| 5 | 1.50 | 473 | 2.62 | 0.194 | 0.181 | 93 | 0.200 | 91 |

As shown by Table II, the polybarium silicate reacted readily with a slight excess of "Petronic Acid" to give up all of the available barium (Example 2). A similar result was obtained (Example 3) in which the barium silicate residue released all of its available barium to form a nearly neutral barium "Petronate." The removal of the barium from barium silicate residues was slightly less efficient in two other examples (Examples 4 and 5) due to the use of larger batches with shorter time for the reaction to go to completion. When a substantial excess of barium was available (Example 1), as basic barium "Petronate" was formed readily and a barium silicate residue resulted. This barium silicate residue was reused as the barium silicate source in Example 3.

*Examples According to Process C,*

*Methods 1, 2 and 3*

The following examples were performed under the ciency. Examples 6 and 7, in which "Petronic Acid" with barium octylphenate as promoter reacted with polybarium silicate, gave the second highest metal ratio and the highest barium efficiency. The amount of water-soluble barium in these cases was less than in the previous examples and may have had a direct bearing on the metal ratio and barium efficiency. In Examples 8 and 9, when barium "Petronate" with barium octylphenate as promoter was allowed to react with the polybarium silicate, the results were inconsistent with fair to poor metal ratio and mediocre barium efficiency. In Examples 10 and 11, when "Petronic Acid" with octylphenol as promoter was reacted with polybarium silicate, the metal ratios were poor although in Example 10 this was probably due to the small excess of barium present. Even under these adverse conditions, however, a substantial reaction occurred. Example 14 represents the preparation of a basic barium sulfonate by reacting polybarium silicate with a sulfonic acid without the use of a promoter.

TABLE III

Basic Salts Prepared by Method 1. Reactants

| Example | Reactant quantities | | | | | Added solvents | |
|---|---|---|---|---|---|---|---|
| | Acid or salt | (G.)[1] | Polybarium silicate (g.) | Promoter | (G.) | Water (g.) | Mineral spirits (g.) |
| 6 | "Petronic Acid" | 9.95 | 15.4 | Barium octylphenoxide | 5.34 | 39 | 20 |
| 7 | ___do___ | 9.95 | 15.4 | ___do___ | 5.34 | 39 | 20 |
| 8 | Barium "Petronate" | 9.27 | 7.02 | ___do___ | 4.68 | 20 | 16 |
| 9 | ___do___ | 39.8 | 76.7 | ___do___ | 17.9 | 60 | 22 |
| 10 | "Petronic Acid" | 9.90 | 8.68 | Octylphenol | 4.12 | 10 | 60 |
| 11 | ___do___ | 33.6 | 65.8 | ___do___ | 12.1 | 60 | 20 |
| 12 | Barium "Petronate" | 39.0 | 90.7 | ___do___ | 12.1 | 60 | |
| 13 | ___do___ | 39.4 | 82.7 | ___do___ | 12.1 | 60 | |
| 14 | Dialkyl benzene sulfonic acid | 80.1 | 216.0 | None | | 76 | [2] 46 |

[1] Material was used in solution of oil or lighter hydrocarbon solvent; values given for barium "Petronate" were found by analysis.
[2] Mineral oil.

TABLE IV

Basic Salts Prepared by Method 1. Conditions and Results

| Example | Reaction type sulfonate promoter | Equivalents of reactants | | | Time (hr.) | | Metal ratio [1] | Percent of water soluble Ba reacted |
|---|---|---|---|---|---|---|---|---|
| | | Sulfonate | Water-soluble polybarium silicate | Promoter | Cook | $CO_2$ blow | | |
| 6 | Acid plus salt | .030 | .063 | .018 | 2.1 | 0 | 2.55 | 94 |
| 7 | ___do___ | .030 | .063 | .018 | 4.5 | 0 | 2.54 | 94 |
| 8 | Salt plus salt | .025 | .0287 | .015 | 4.0 | 0 | 2.03 | 65 |
| 9 | ___do___ | .10 | .330 | .059 | 3.2 | 3.0 | 2.94 | 36 |
| 10 | Acid plus acid | .030 | .0356 | .020 | 11.0 | 0 | 1.50 | 127 |
| 11 | ___do___ | .10 | .400 | .059 | 2.8 | 2.8 | 1.89 | 47 |
| 12 | Salt plus acid | .10 | .329 | .059 | 2.8 | 3.0 | 3.31 | 77 |
| 13 | ___do___ | .10 | .300 | .059 | 3.0 | 3.0 | 3.25 | 80 |
| 14 | Acid | .20 | 1.18 | | 5.0 | 0 | 2.23 | 38 |

[1] Ratio of barium equivalents to sulfonic acid equivalents in the product.

TABLE V

Basic Salts Prepared by Method 2, Conditions and Results

| Example | Equivalents of reactants | | | Solvents (g) | | | Reaction time (hr.) | | Metal ratio [2] | Percent of water-soluble Ba reacted |
|---|---|---|---|---|---|---|---|---|---|---|
| | "Petronic Acid" | Water-soluble polybarium silicate | Octylphenol promoter | Water | Mineral spirits | Mineral oil [1] | Cook | $CO_2$ blow | | |
| 15 | 0.10 | 0.396 | 0.059 | 60.0 | 0 | 94 | 2.8 | 2.8 | 2.66 | 67 |
| 16 | 0.10 | 0.396 | 0.059 | 60.0 | 0 | 94 | 3.8 | 2.7 | 3.53 | 89 |
| 17 | 0.10 | 0.50 | 0.059 | 60.0 | 20.0 | 94 | 3.5 | 2.8 | 2.93 | 59 |
| 18 | 0.10 | 0.40 | 0.059 | 60.0 | 20.0 | 94 | 3.0 | 2.8 | 2.90 | 72 |
| 19 | 0.10 | 0.40 | 0.059 | 34.0 | 20.0 | 94 | 3.5 | 3.0 | 2.47 | 61 |
| 20 | 0.10 | 0.30 | 0.059 | 60.0 | 20.0 | 94 | 4.0 | 2.8 | 2.33 | 78 |
| 21 | 0.10 | 0.30 | 0.059 | 26.0 | 20.0 | 94 | 4.2 | 2.6 | 2.84 | 95 |
| 22 | 0.10 | 0.50 | 0.059 | 42.5 | 20.0 | 94 | 3.8 | 2.8 | 2.70 | 54 |

[1] Comprises solvent for "Petronic Acid" plus 61 g. light mineral oil.
[2] Ratio of barium equivalents to sulfonic acid equivalents in the product.

Examples of the use of Method 2 are given in Table V. By the use of Method 2, no independent preparation of barium salts as starting materials is necessary. The "Petronic Acid," and, optionally, the phenol as promoter, are placed in the reaction vessel with sufficient polybarium silicate to neutralize all of the "Petronic Acid." The "Petronic Acid" is strong enough to react with both the acid- and water-soluble barium present in the polybarium silicate. After about 1 hr. of reflux the remainder of the polybarium silicate is added to provide the additional barium for increasing the metal ratio. Examples 15 and 16 represent identical runs except that in 16 heating was continued for 1 hr. after the dehydration step prior to blowing with carbon dioxide. The 1 hr. of heating after dehydration was used in all the succeeding examples. In Examples 17 through 22 the effects of varying the amounts of polybarium silicate and water added are shown. In Examples 20, 18 and 17, 60 grams of water (6.7 to 11.0 mols $H_2O$ per equivalent of water-soluble barium) were used with 0.30, 0.40 and 0.50 equivalents of water-soluble barium. Under these conditions, Example 18 was best with a metal ratio of 2.90 and 72% efficiency of the barium. In Example 17 the metal ratio was approximately the same as in Example 18 but the barium efficiency was lower. In Example 20 the barium efficiency was a little higher but the metal ratio was substantially lower. In Examples 21, 19 and 22, 0.3, 0.4 and 0.5 equivalents of water-soluble barium, respectively, were used with about 4.7 mols of water per equivalent of water-soluble barium. Example 21 was the best with the highest metal ratio and barium efficiency. The larger excesses of barium in Examples 19 and 22 yielded slightly lower metal ratios and the efficiencies were relatively low.

EXAMPLE 23

This example illustrates the practice of the invention according to Method 3 of Process C. A barium silicate residue was used which had resulted from the reaction of a polybarium silicate with sulfonic acid in the preparation of a basic sulfonate. It contained 69.1% available barium calculated as BaO. 33.6 grams of this residue containing 0.303 equivalent of available barium was reacted with 202 grams (0.300 equivalent) of a sulfonic acid ("Petronic" acid) in mineral oil in the presence of 175 grams of mineral spirits and 60 grams of water. The nearly neutral barium sulfonate produced was separated from the siliceous residue. It contained 0.259 equivalent of combined barium corresponding to an 86% recovery of the available barium values in the original barium silicate residue. An aliquot of the barium sulfonate solution containing 0.100 equivalent of sulfonate and 0.086 equivalent of combined barium was then reacted in the presence of 0.059 equivalent of octyl-phenol promoter with polybarium silicate containing 0.329 equivalent of water soluble barium according to Example 12. The basic barium sulfonate obtained from this reaction contained 0.331 equivalent of combined barium corresponding to a metal ratio of 3.31. The recovery of water soluble barium from the polybarium silicate was 75% and the barium silicate residue was reacted with sulfonic acid to make additional neutral barium sulfonate as in the first step of this example.

EXAMPLE 24

Barite ore obtained from Missouri and analyzing 96.5% $BaSO_4$, 2.5% $SiO_2$ and 0.5% $Fe_2O_3$ was ground to −100 mesh in a hammer-mill and mixed with silica flour (−200 mesh, 96.2% $SiO_2$). 2% of a 50% calcium lignosulfate slurry in the form of a 12.5% solution was sprayed on the dry powder to act as a binder and the whole mixed in a pug mill. The amounts of barite and silica flour were adjusted so that the mixture contained a barium to silicon ratio of 2.5 to 1 by molecular equivalents.

This mixture was fed into a rotary kiln 35′ long with a ½″ pitch per foot and a 30″ shell diameter lined with a 70% alumina refractory brick 4½″ thick. The kiln was fitted with means to control the rate of admission of air so that the proper atmospheric control within the kiln could be maintained and a gas burner burning natural gas was used to fire the kiln. The material exit of the rotary kiln was a spill gate adjustable to allow only product to flow through. The exhaust gases from the kiln were continuously analyzed, and the gas and air adjusted to maintain an exhaust gas concentration of hydrogen of 2% to 2.5% and a temperature in the hottest zone of 1400° C. to 1450° C.

The mixture was fed into the kiln at a rate of 150 lbs./hr., allowing pelletization to occur in the back end of the kiln. The decomposition of barite averaged about 80%. The polybarium silicate product produced contained water-soluble barium values and some undecomposed $BaSO_4$.

The polybarium silicate produced was reacted with "Petronic Acid" in the same manner as described in Example 3. Upon filtration of the hot neutral barium sulfonate solution a residue was obtained which consisted primarily of $SiO_2$ and $BaSO_4$ in a ratio of approximately 1.1 mol of $SiO_2$ to 0.3 mol of undecomposed $BaSO_4$. This residue can be recycled to replace the silica flour in whole or in part.

EXAMPLE 25

The same procedures as in Example 24 were followed, except that the kiln feed was a mixture of silicon dioxide-containing residue as obtained from Example 24 and barite. A continuous operation was effected by recycling the silicon dioxide-containing residue and adding sufficient barite containing 96.5% $BaSO_4$ to bring the barium/silicon ratio to 2.5 to 1. This feed composition was attained as follows:

| | Mols of barium present |
|---|---|
| From fresh barite | 2.24 |
| From recycled $BaSO_4$ residue | 0.26 |
| Total | 2.50 |

| | Mols of silicon present |
|---|---|
| From $SiO_2$ content of fresh barite | 0.13 |
| From recycled residue | 0.87 |
| Total | 1.00 |

The polybarium silicate produced was reacted with organic sulfonic acid derivatives as in any of the preceding examples with comparable results.

The above examples are illustrative, but are not to be considered as limitations of our invention, the scope of which is to be determined by the appended claims.

We claim:
1. The process of producing barium salts of organic sulfonic acids from organic sulfonic acid derivatives selected from the group consisting of oil-soluble organic sulfonic acids derived from hydrocarbons having at least 18 carbon atoms and ammonium and alkali metal salts thereof and insoluble barium compounds selected from the group consisting of barium sulfate, barium sulfite and barium carbonate, which comprises decomposing said insoluble barium compounds by heating with a source of silicon dioxide at a temperature between 1300° and 1500° C., said insoluble barium compounds and the source of silicon dioxide being present in a barium to silicon ratio of from 1.1 to 1, to 3 to 1 to produce a polybarium silicate, reacting said polybarium silicate with said sulfonic acid derivative in the presence of water and a hydrocarbon solvent at refluxing temperatures, recovering said barium salts of organic sulfonic acids and a silicon dioxide-containing residue and recycling said residue as a source of silicon dioxide.

2. The process of claim 1 wherein said organic sulfonic acid derivatives are mahogany petroleum sulfonic acid derivatives.

3. The process of claim 1 wherein said polybarium silicate is reacted with a petroleum sulfonic acid in the presence of water and a hydrocarbon solvent and the barium salt of the petroleum sulfonic acid is further reacted with said polybarium silicate and a promoter selected from the group consisting of phenols and barium phenolates.

4. The process of claim 1 wherein said silicon dioxide-containing residue recovered contains residual barium values and is further reacted with a petroleum sulfonic acid in the presence of water and a hydrocarbon solvent, to recover further barium salts of petroleum sulfonic acids and a silicon dioxide-containing residue.

5. The process of claim 1 wherein said silicon dioxide-containing residue recovered contains residual barium values and is further reacted with a mineral acid in the presence of water to recover the residual barium values as water soluble barium salts of said mineral acid and a silicon dioxide-containing residue.

6. The process of claim 1 wherein said polybarium silicate is reacted with an alkali metal petroleum sulfonate in the presence of a mineral acid, water and a hydrocarbon solvent.

7. The process of claim 6 wherein said silicon dioxide-containing residue contains residual barium values and is further reacted with an alkali metal petroleum sulfonate in the presence of a mineral acid, water and a hydrocarbon solvent.

8. The process of claim 1 wherein said polybarium silicate is reacted with an ammonium petroleum sulfonate in the presence of water and a hydrocarbon solvent.

9. The process of claim 8 wherein said silicon dioxide-containing residue contains residual barium values and is further reacted with an alkali metal petroleum sulfonate in the presence of a mineral acid, water and a hydrocarbon solvent.

10. The process of producing barium salts of mahogany petroleum sulfonic acids from (1) mahogany petroleium sulfonic acid derivatives selected from the group consisting of the free acids, and ammonium and alkali metal salts thereof, and (2) insoluble barite, which comprises decomposing said barite by heating with a source of silicon dioxide at a temperature between 1300° and 1500° C., said barite and said source of silicon dioxide being present in a barium to silicon ratio of from 2.2 to 1 to 2.7 to 1 to produce a polybarium silicate, reacting said polybarium silicate with said mahogany petroleum sulfonic acid derivative in the presence of water and a hydrocarbon solvent at refluxing temperatures, recovering said barium salts of mahogany petroleum sulfonic acids and a silicon dioxide-containing residue, and recycling said residue as a source of silicon dioxide.

References Cited in the file of this patent

UNITED STATES PATENTS

| | | |
|---|---|---|
| 2,483,800 | Zimmer et al. | Oct. 4, 1949 |
| 2,846,466 | Crosby | Aug. 5, 1958 |
| 2,856,360 | Schlicht | Oct. 14, 1958 |

FOREIGN PATENTS

| | | |
|---|---|---|
| 797,409 | Great Britain | July 2, 1958 |

OTHER REFERENCES

Mellor: "Comp. Treat. on Inorg. and Theor. Chem.," vol. 6, pages 353, 371 (1925).